United States Patent
Yang

(10) Patent No.: US 9,880,654 B2
(45) Date of Patent: Jan. 30, 2018

(54) TOUCH DISPLAY DRIVE CIRCUIT, TOUCH DISPLAY DRIVE METHOD AND DISPLAY DEVICE

(71) Applicants: BOE Technology Group Co., Ltd., Beijing (CN); Beijing BOE Optoelectronics Technology Co., Ltd., Beijing (CN)

(72) Inventor: Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 503 days.

(21) Appl. No.: 14/388,090

(22) PCT Filed: Dec. 17, 2013

(86) PCT No.: PCT/CN2013/089675
§ 371 (c)(1),
(2) Date: Sep. 25, 2014

(87) PCT Pub. No.: WO2015/027631
PCT Pub. Date: Mar. 5, 2015

(65) Prior Publication Data
US 2016/0246424 A1    Aug. 25, 2016

(30) Foreign Application Priority Data

Aug. 26, 2013  (CN) .......................... 2013 1 0375517

(51) Int. Cl.
*G06F 3/045* (2006.01)
*G06F 3/041* (2006.01)
(Continued)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ...... G06F 3/0416; G06F 3/0412; G06F 3/044; G09G 3/3258; G09G 3/3266;
(Continued)

(56) References Cited

U.S. PATENT DOCUMENTS 9,122,339 B2    9/2015  Yang
9,529,467 B2   12/2016  Yang
(Continued)

FOREIGN PATENT DOCUMENTS

CN        1916712 A    2/2007
CN      101943974 A    1/2011
(Continued)

OTHER PUBLICATIONS

Office Action issued in the corresponding Korean Application No. 10-2014-7014735.
Extended European Search Report issued in the corresponding European Appication No. 13854233.7 dated Jun. 1, 2016.
(Continued)

*Primary Examiner* — Michael Pervan
*Assistant Examiner* — Andrew Lee
(74) *Attorney, Agent, or Firm* — Haug Partners LLP

(57) ABSTRACT

The present invention provides a touch display drive circuit, a touch display drive method and a display device. The circuit comprises a touch module and a display drive module, wherein the display drive module is connected with a data line, a first scanning line, a second scanning line, a control line, a first voltage source, a third voltage source and a fourth voltage source; the touch module is connected with the first scanning line, the second scanning line, a reading line and a second voltage source, and the touch module receives the data signal input from the display drive module (Continued)

under the action of the signals input from the first scanning line and the second scanning line to reset the touch module; when touch occurs, the touch module provides a touch signal, and the reading line receives the touch signal.

16 Claims, 5 Drawing Sheets

(51) Int. Cl.
- *G06F 3/044* (2006.01)
- *G09G 3/3233* (2016.01)
- *G09G 3/3258* (2016.01)
- *G09G 3/3266* (2016.01)
- *G09G 3/3291* (2016.01)

(52) U.S. Cl.
CPC ......... *G09G 3/3233* (2013.01); *G09G 3/3258* (2013.01); *G09G 3/3266* (2013.01); *G09G 3/3291* (2013.01); *G09G 2300/0809* (2013.01); *G09G 2300/0861* (2013.01); *G09G 2310/0202* (2013.01); *G09G 2310/0262* (2013.01); *G09G 2320/043* (2013.01)

(58) Field of Classification Search
CPC ............... G09G 3/3291; G09G 3/3233; G09G 2310/0202; G09G 2300/0809; G09G 2310/0262; G09G 2300/0861; G09G 2320/043
See application file for complete search history.

(56) References Cited

U.S. PATENT DOCUMENTS

| | | | |
|---|---|---|---|
| 2005/0099372 | A1 | 5/2005 | Nakamura et al. |
| 2005/0200293 | A1 | 9/2005 | Naugler, Jr. et al. |
| 2009/0109204 | A1 | 4/2009 | Aoki |
| 2009/0278810 | A1* | 11/2009 | Ma .................. G06F 3/0412 345/173 |
| 2011/0273397 | A1* | 11/2011 | Hanari .................. G06F 3/0412 345/174 |

FOREIGN PATENT DOCUMENTS

| | | |
|---|---|---|
| CN | 102062966 A | 5/2011 |
| CN | 103135846 A | 6/2013 |
| CN | 103208255 A | 7/2013 |
| CN | 103 246 396 A | 8/2013 |
| CN | 103236238 A | 8/2013 |
| CN | 103246396 A | 8/2013 |
| CN | 203503280 U | 3/2014 |
| KR | 10-2011-0003187 A | 1/2011 |

OTHER PUBLICATIONS

Notice of Preliminary Rejection from KoreanIntellectual Property Office (KIPO) for corresponding Korean application 10-2014-7014735 dated Aug. 7, 2015 with English translation.
Notification of the First Office Action and search report issued by the Chinese Patent Office for priority application 201310375517.4 dated Jan. 21, 2015 with English translation.
International Search Report issued by Chinese Patent Office during international phase of PCT/CN2013/089675 dated May 29, 2014.
Office Action issued in the corresponding Japanese Application No. 2016-537083 dated Jun. 5, 2017 and its English Translation.

* cited by examiner

TOUCH DISPLAY DRIVE CIRCUIT, TOUCH DISPLAY DRIVE METHOD AND DISPLAY DEVICE

This application is a 371 of PCT/CN2013/089675 filed on Dec. 17, 2013, which claims priority benefits from Chinese Patent Application Number 201310375517.4 filed Aug. 26, 2013, the disclosure of which is incorporated herein by reference.

FIELD OF THE INVENTION

The present invention relates to the field of display technology, and particularly relates to a touch display drive circuit, a touch display drive method and a display device.

BACKGROUND OF THE INVENTION

Active matrix organic light emitting diode (AMOLED) displays are one of hotspots in the field of flat-panel displays nowadays Compared with thin film transistor-liquid crystal displays (TFT-LCDs), OLEDs have the advantages of low power consumption, low production cost, self-luminous property, wide viewing angle, fast response speed and the like. At present, the OLEDs start to replace the traditional LCD (liquid crystal display) screens in the display fields of mobile phones, PDAs, digital cameras and the like. Pixel drive circuit design is the core technical content of the AMOLED displays and has important research significance.

According to different relative positions between a touch panel and a display panel, the existing display devices with a touch function may be generally divided into two types: on cell touch panels and in cell touch panels. Compared with the on cell touch panels, the in cell touch panels are smaller in thickness and higher in light transmissivity, thus being capable of providing applications with better performances. If in cell touch technology can be integrated with AMO-LEDs, that is, a Touch manufacture procedure is integrated with an Array manufacture procedure, then the integration level of an in cell touch circuit and an AMOLED drive circuit may be improved, and the production cost may be reduced simultaneously.

SUMMARY OF THE INVENTION

The present invention provides a touch display drive circuit, a touch display drive method and a display device, which may reduce production processes for touch display products during production, save cost, and increase aperture opening ratio of the products simultaneously, thus increasing additional value.

In order to achieve the above objective, the present invention provides a touch display drive circuit, comprising: a touch module and a display drive module, wherein the display drive module comprises a drive unit and a light emitting unit;

the display drive module is connected with a data line, a first scanning line, a second scanning line, a control line, a first voltage source, a third voltage source and a fourth voltage source, and the display drive module, under the control of signals input from the first scanning line and the second scanning line, is used for compensating the drive unit, writing in a data signal input from the data line, outputting the data signal to the touch module simultaneously, and then driving the light emitting unit to emit light;

the touch module is connected with the first scanning line, the second scanning line, a reading line and a second voltage source, and the touch module, under the action of signals input from the first scanning line and the second scanning line, is used for receiving the data signal input from the display drive module to reset the touch module, and when touch occurs, the touch module provides a touch signal, and the reading line receives the touch signal.

Optionally, the display drive module further comprises: a data writing unit, a drive compensation unit, a voltage stabilizing unit and a light emitting control unit;

the data writing unit is used for writing a data voltage provided by the data line into the drive compensation unit under the action of a signal input from the first scanning line;

the voltage-stabilizing unit is used for stabilizing a voltage of the drive compensation unit under the action of a control signal input from the control line;

the drive compensation unit is used for performing discharge compensation on a threshold voltage of the drive unit under the action of a signal input from the first scanning line; and the light emitting unit is used for emitting light under a drive of the drive unit and the light emitting control unit.

Optionally, the data writing unit comprises a sixth switch, the drive compensation unit comprises a second capacitor, a fifth switch and a seventh switch, the drive unit comprises a drive transistor, the voltage-stabilizing unit comprises an eighth switch, the light emitting control unit comprises a fourth switch, and the light emitting unit comprises a light emitting diode;

a gate electrode of the fourth switch is connected with the second scanning line, a first electrode of the fourth switch is connected with a second electrode of the eighth switch and the first voltage source, and a second electrode of the fourth switch is connected with a second electrode of the fifth switch and a first electrode of the drive transistor;

a gate electrode of the fifth switch is connected with a gate electrode of the sixth switch and a first scanning line, the first electrode of the fifth switch is connected with a first end of the second capacitor and a gate electrode of the drive transistor, and a second electrode of the fifth switch is connected with the first electrode of the drive transistor;

the gate electrode of the sixth switch is connected with the first scanning line, a first electrode of the sixth switch is connected with the data line, and a second electrode of the sixth switch is connected with the first electrode of the eighth switch, the second end of the second capacitor and a first electrode of a first switch;

a gate electrode of the seventh switch is connected with the first scanning line and a gate electrode of a third switch, a first electrode of the seventh switch is connected with a second electrode of the drive transistor and the light emitting unit, and a second electrode of the seventh switch is connected with the third voltage source; wherein a gate electrode of the eighth switch is connected with the control line, the first electrode of the eighth switch is connected with the second end of the second capacitor and the first electrode of the first switch, and the second electrode of the eighth switch is connected with the first voltage source; and the gate electrode of the drive transistor is connected with the first end of the second capacitor, and the second electrode of the drive transistor is connected with the light emitting unit.

Optionally, the touch module comprises: a signal input unit and a touch sensing unit connected with the signal input unit, wherein the signal Input unit is used for writing a voltage signal input from the data line into the touch sensing unit under the control of a signal input from the second scanning line; and the touch sensing unit is used for providing a touch signal for the reading line when touch occurs.

Optionally, the signal input unit comprises the first switch, and the touch sensing unit comprises a first capacitor, a second switch and the third switch; wherein a gate electrode of the first switch is connected with the second scanning line, the first electrode of the first switch is connected with the drive compensation unit, and a second electrode of the first switch is connected with the touch electrode;

a gate electrode of the second switch is connected with the touch electrode, a first electrode of the second switch is connected with a first electrode of the third switch, and a second electrode of the second switch is connected with a second end of the first capacitor and the second voltage source;

the gate electrode of the third switch is connected with the first switch and the drive compensation unit, and a second electrode of the third switch is connected with the reading line; and a first end of the first capacitor is connected with the second electrode of the first switch and the gate electrode of the second switch, and the second end of the first capacitor is connected with the second voltage source.

Optionally, the first switch, the second switch, the third switch, the fourth switch, the fifth switch, the sixth switch, the seventh switch, the eighth switch and the drive transistor are N-type thin film transistors, and the second switch is an amplifying transistor.

In order to achieve the above objective, the present invention provides a display device including the above-mentioned touch display drive circuit.

In order to achieve the above objective, the present invention provides a drive method for the above-mentioned touch display drive circuit, the touch display drive method comprises:

a first stage: the data writing unit writes a data signal into the drive compensation unit under the control of a signal input from the first scanning line, simultaneously under the control of a signal input from the second scanning line, the signal input unit inputs the data signal into the touch screening unit, and the reading line receives an initial signal;

a second stage: the drive compensation unit compensates a threshold voltage of the drive unit under the control of a signal input from the first scanning line, simultaneously, the touch sensing unit detects a touch signal, and the reading line receives the touch signal;

a third stage: the voltage stabilizing unit stabilizes a voltage of the drive compensation unit under the action of a control signal input from the control line, and at this moment, the touch sensing unit is in a standstill state; and a fourth stage: the light emitting control unit is controlled to be turned on by a signal input from the second scanning line, the light emitting unit emits light under the control of the light emitting control unit and the drive unit, and at this moment, the touch sensing unit is in a standstill state.

Optionally, the first stage specifically is: the sixth switch is turned on and writes the data signal into the second capacitor to charge the second capacitor under the control of the signal input from the first scanning line, simultaneously the first switch is turned on and inputs the data signal to the first capacity to charge the first capacity under the control of the signal input from the second scanning line, the second switch and the third switch are turned on, and the reading line receives the initial signal;

the second stage specifically is: the fifth switch and the seventh switch are turned on, and the second capacitor discharges and compensates the threshold voltage of the drive transistor under the control of the signal input from the first scanning line, simultaneously the touch sensing unit detects the touch signal, and the reading line receives the touch signal;

the third stage specifically is: the eighth switch stabilizes the voltage of the second capacitor under the action of the control signal input from the control line, and at this moment, the touch sensing unit is in the standstill state; and the fourth stage specifically is: the fourth switch is controlled to be turned on by the signal input from the second scanning line, the light emitting unit emits light under the control of the fourth switch and the drive transistor, and at this moment, the touch sensing unit is in the standstill state.

Optionally, the first switch, the second switch, the third switch, the fourth switch, the fifth switch, the sixth switch, the seventh switch, the eighth switch and the drive transistor are N-type thin film transistors, and the second switch is an amplifying transistor.

The present invention provides a touch display drive circuit, a touch display drive method and a display device, and the circuit comprises a touch module and a display drive module, wherein the display drive module, under the control of signals input from the data line, the first scanning line and the second scanning line, is used for compensating a drive unit, writing a data signal input from the data line, outputting the data signal to the touch module simultaneously, and then driving a light emitting unit to emit light; the touch module, under the action of the signals input from the first scanning line and the second scanning line, is used for receiving the data signal input from the display drive module to reset the touch module, and when touch occurs, the touch module provides a touch signal, and the reading line receives the touch signal. The technical solution of the present invention may reduce production processes for touch display products during production, save cost, and increased aperture opening ratio of the products simultaneously, thus increasing additional value.

DETAILED DESCRIPTION OF THE EMBODIMENTS

For the person skilled in the art to better understand the technical solution of the present invention, a touch display drive circuit, a touch display drive method and a display device provided by the present invention are further described below in details in conjunction with the accompanying drawings.

Figure 1:
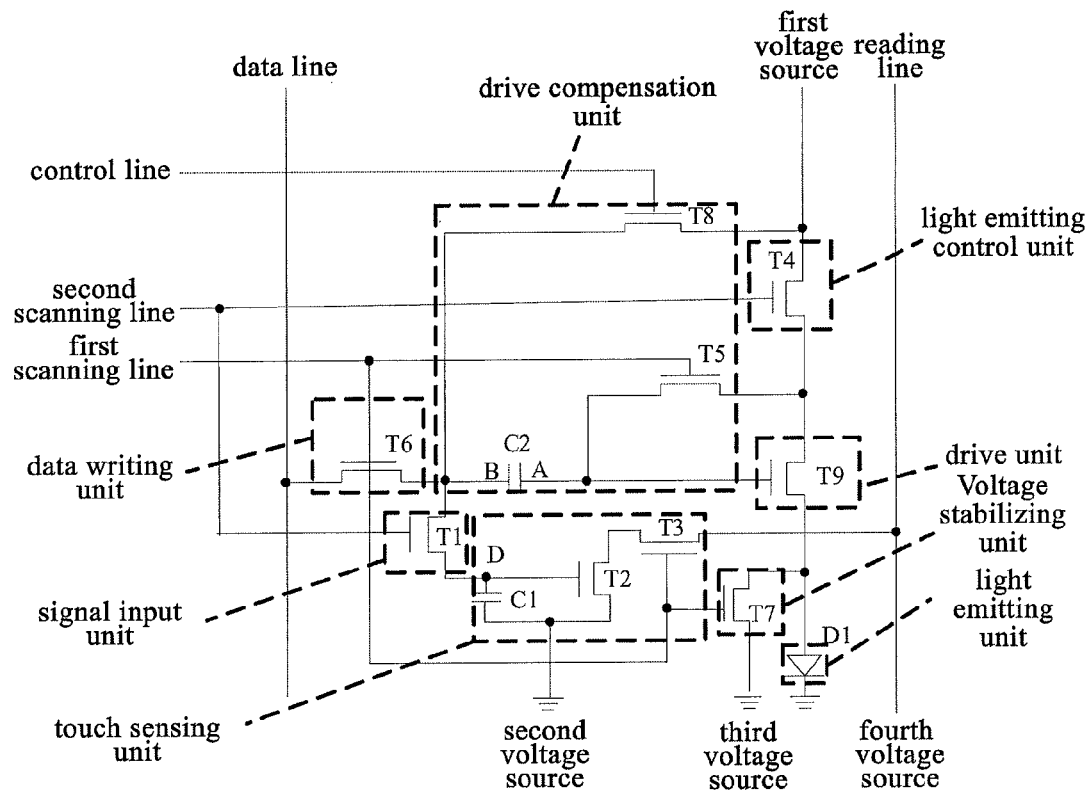
FIG. 1 is a structural schematic diagram of a touch display drive circuit provided by an embodiment of the present invention.

FIG. 1 is a structural schematic diagram of a touch display drive circuit provided by an embodiment of the present invention, as shown in FIG. 1, the touch display drive circuit comprises: a touch module and a display drive module comprising a drive unit and a light emitting unit.

The display drive module is connected with a data line, a first scanning line, a second scanning line, a control line, a first voltage source, a third voltage source and a fourth voltage source. The display drive module, under the control of signals input from the data line, the first scanning line and the second scanning line, is used for compensating the drive unit, writing a data signal input from the data line outputting the data signal to the touch module simultaneously, and then driving the light emitting unit to emit light.

The touch module is connected with the first scanning line, the second scanning line, a reading line and a second voltage source. The touch module, under the action of the signals input from the first scanning line and the second scanning line, is used for receiving the data signal input from the display drive module to reset the touch module, and when touch occurs, the touch module provides a touch signal, and the reading line receives the touch signal.

Preferably, the display drive module further comprises: a data writing unit, a drive compensation unit, a voltage stabilizing unit and a light emitting control unit; wherein the data writing unit is used for writing a data voltage provided by the data line into the drive compensation unit under the action of the signal input from the first scanning line;

the voltage-stabilizing unit is used for stabilizing the voltage of the drive compensation unit under the action of the control signal input from the control line;

the drive compensation unit is used for performing discharge compensation on the threshold voltage of the drive unit under the action of the signal input from the first scanning line; and the light emitting unit is used for emitting light under the drive of the drive unit and the light emitting control unit.

Specifically, the data writing unit comprises a sixth switch T6, the drive compensation unit comprises a second capacitor C2, a fifth switch T5 and a seventh switch T7, the drive unit comprises a drive transistor T9, the voltage-stabilizing unit comprises an eighth switch T8, the light emitting control unit comprises a fourth switch T4, and the light emitting unit comprises a light emitting diode; wherein the gate electrode of the fourth switch T4 is connected with the second scanning line, the first electrode of the fourth switch T4 is connected with the second electrode of the eighth switch T8 and the first voltage source, and the second electrode of the fourth switch T4 is connected with the second electrode of the fifth switch T5 and the first electrode of the drive transistor T9;

the gate electrode of the fifth switch T5 is connected with the gate of the sixth switch T6 and the first scanning line, the first electrode of the fifth switch T5 is connected with the first end of the second capacitor C2 and the gate electrode of the drive transistor T9, and the second electrode of the fifth switch T5 is connected with the first electrode of the drive transistor T9;

the gate electrode of the sixth switch T6 is connected with the first scanning line, the first electrode of the sixth switch T6 is connected with the data line, and the second electrode of the sixth switch T6 is connected with the first electrode of the eighth switch T8, the second end of the second capacitor C2 and the first electrode of the first switch T1;

the gate electrode of the seventh switch T7 is connected with the first scanning line and the gate electrode of the third switch T3, the first electrode of the seventh switch T7 is connected with the second electrode of the drive transistor T9 and the organic light emitting diode, and the second electrode of the seventh switch T7 is connected with the third voltage source;

the gate electrode of the eighth switch T8 is connected with the control line, the first electrode of the eighth switch T8 is connected with the second end of the second capacitor C2 and the first electrode of the first switch T1, and the second electrode of the eighth switch T8 is connected with the first voltage source; and the gate electrode of the drive transistor T9 is connected with the first end of the second capacitor C2, and the second electrode of the drive transistor T9 is connected with the organic light emitting diode.

Preferably, the touch module comprises: a signal input unit and a touch sensing unit connected with the signal input unit, the signal input unit is used for writing a voltage signal input from the data line into the touch sensing unit under the control of the signal input from the second scanning line, and the touch sensing unit is used for providing a touch signal for the reading line when touch occurs.

Specifically, the signal input unit comprises a first switch T1, and the touch sensing unit comprises a first capacitor C1, a second switch T2 and the third switch T3; wherein the gate electrode of the first switch T1 is connected with the second scanning line, the first electrode of the first switch T1 is connected with the drive compensation unit, and the second electrode of the first switch T1 is connected with the touch electrode;

the gate electrode of the second switch T2 is connected with the touch electrode, the first electrode of the second switch T2 is connected with the first electrode of the third switch T3, and the second electrode of the second switch T2 is connected with the second end of the first capacitor C1 and the second voltage source;

the gate electrode of the third switch T3 is connected with the first scanning line and the drive compensation unit, and the second electrode of the third switch T3 is connected with the reading line; and the first end of the first capacitor C1 is connected with the second electrode of the first switch T1 and the gate electrode of the second switch T2, and the second end of the first capacitor C1 is connected with the second voltage source.

Preferably, the first switch T1, the second switch T2, the third switch T3, the fourth switch T4, the fifth switch T5, the sixth switch T6, the seventh switch T7, the eighth switch T8 and the drive transistor T9 are N-type thin film transistors, and the second switch T2 is an amplifying transistor.

It should be noted that, in the embodiment of the present invention, the first electrode and the second electrode in each of the first switch T1, the second switch T2, the third switch T3, the fourth switch T4, the fifth switch T5, the sixth switch T6, the seventh switch T7, the eighth switch T8 and the drive transistor T9 serve as a source electrode and a drain electrode. The first electrodes and the second electrodes in the switches are identical in structure. In actual application, for one switch, according to its position and function, its first electrode may serve as the source electrode, and correspondingly, its second electrode serves as the drain electrode; or, its first electrode may serve as the drain electrode, and correspondingly, its second electrode serves as the source electrode. The N-type transistor adopted in the embodiment of the present invention is turned on when its gate electrode is high-level and turned off when its gate electrode is low-level, and the second switch T2 is an amplifying transistor and capable of amplifying the touch signal, thus improving the detection sensitivity of the touch signal.

The working process of the touch display drive circuit in the embodiment is described below in details in conjunction with FIGS. 2 to 7.

Figure 2:
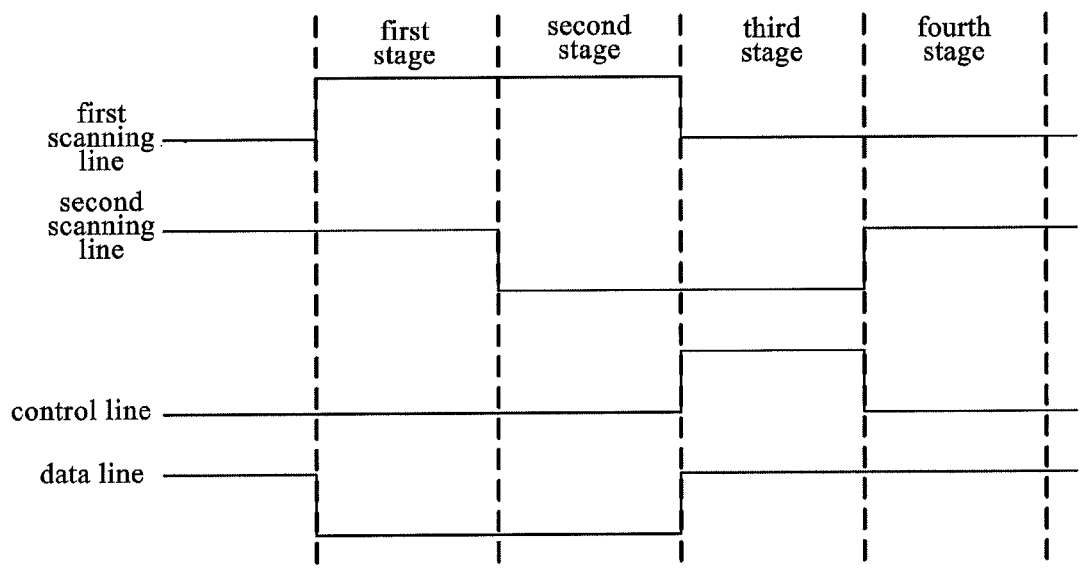
FIG. 2 is a state schematic diagram of the signal timing sequence of a touch display drive circuit in the embodiment.

FIG. 2 is a state schematic diagram of the signal timing sequence of a touch display drive circuit in the embodiment. As shown in FIG. 2, the first stage is a stage for touch module resetting, display signal resetting and initialization signal acquisition, the second stage is a stage for touch signal acquisition and display discharge compensation, the third stage is a stage for touch signal standstill and display hop buffering, the fourth stage is a stage for touch standstill and display light emitting, a high-level Vdd signal is input from the first voltage source, a common voltage Vcom signal is input from the second voltage source, low-level signals Vss are input from the third voltage source and the fourth voltage source, and a Vdata signal is input from the data line.

Figure 3:
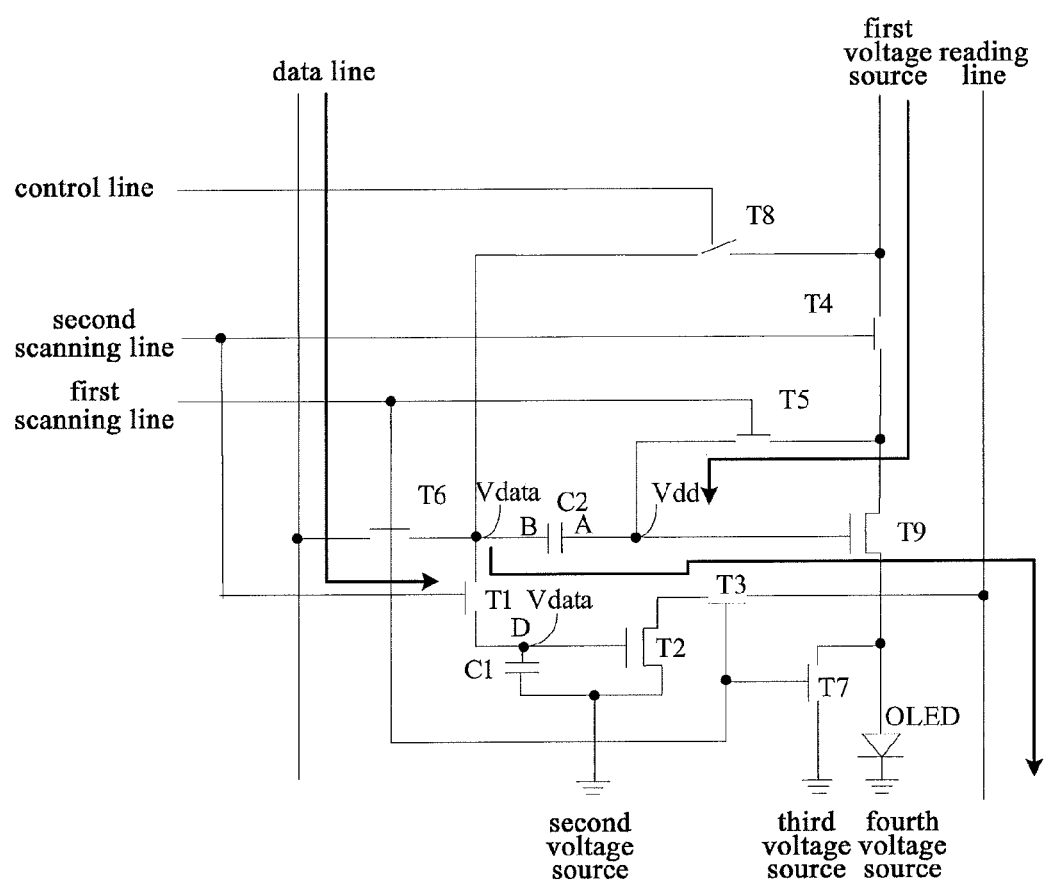
FIG. 3 is an equivalent circuit schematic diagram of a touch display drive circuit in the embodiment in a first stage.

FIG. 3 is an equivalent circuit schematic diagram of a touch display drive circuit in the embodiment in the first stage. As shown in FIGS. 2 and 3, in the first stage, a high-level signal is applied to the first scanning line, a high level is applied to the second scanning line, a low level is applied to the control line, and a low level is applied to the data line. At this moment, the first switch T1, the fourth switch T4, the fifth switch T5, the sixth switch T6 and the seventh switch T7 are turned on, and the eighth switch T8 is turned off. The voltage Vd received by the touch electrode D from the data line is equal to Vdata, the voltage Vb received by the second end B of the second capacitor C2 from the data line is equal to Vdata, the second switch T2 may serve as an amplifying transistor for amplifying a current signal, and the first electrode of the second switch T2 is connected with the second voltage source, which provides a low-level voltage. At this moment, the second switch T2 is turned on to amplify the current signal, the third switch T3 is turned on, and the reading line receives an initial reference current signal. Simultaneously, the first voltage source charges the first end A of the second capacitor C2 to Vdd, that is, Va is equal to Vdd. So far touch module resetting, display signal resetting and initialization signal acquisition are finished.

Figure 4:
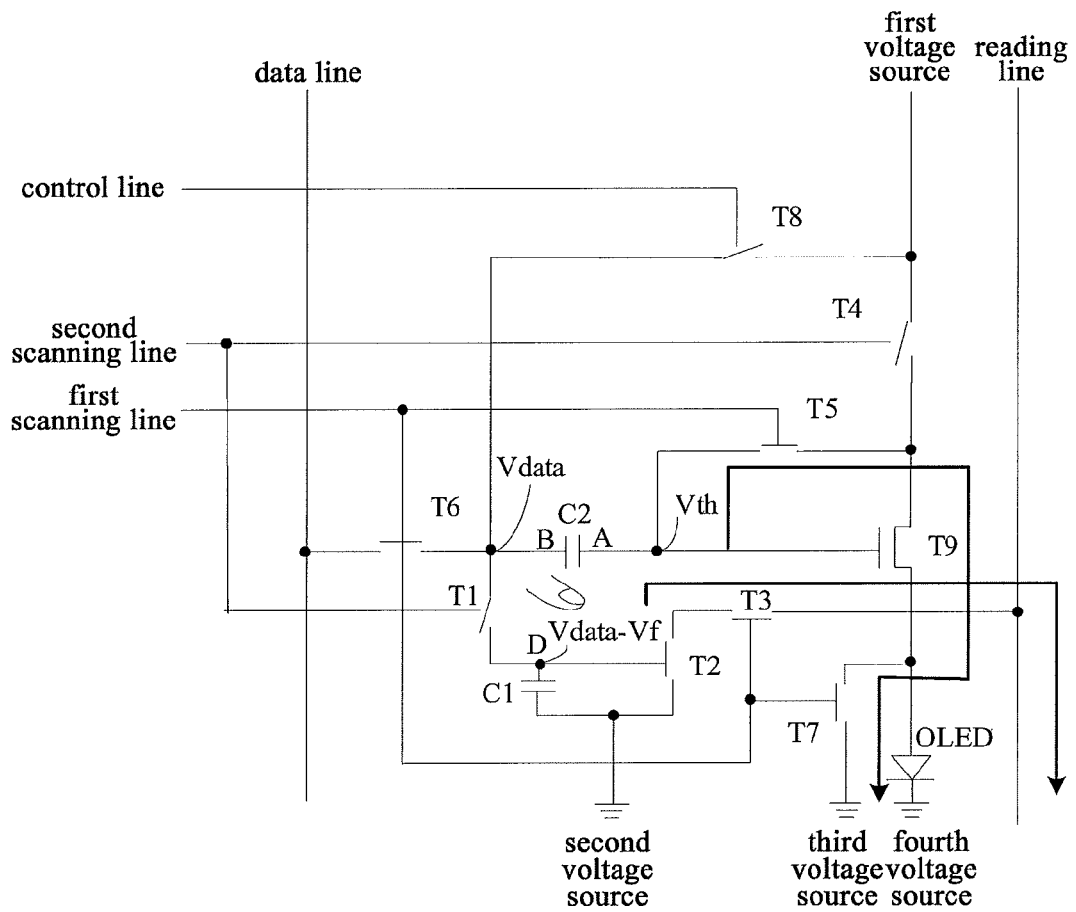
FIG. 4 is an equivalent circuit schematic diagram of the touch display drive circuit in the embodiment in a second stage.
Figure 5:
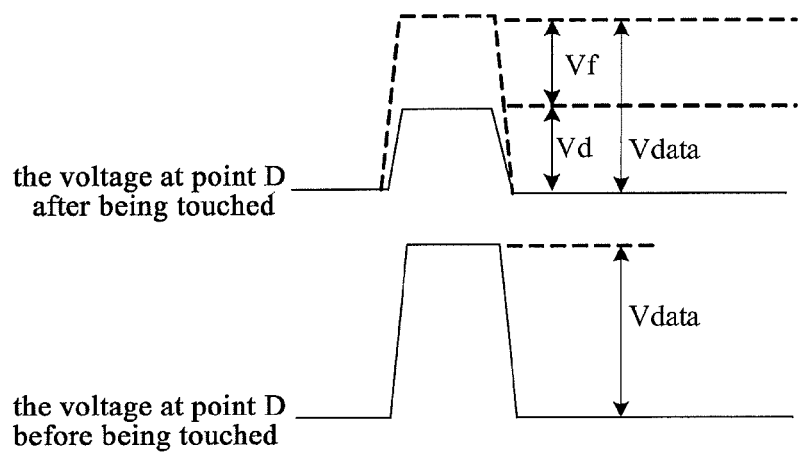
FIG. 5 is a voltage change schematic diagram of the touch electrode in a touch display drive circuit in the embodiment.

FIG. 4 is an equivalent circuit schematic diagram of the touch display drive circuit in the embodiment in the second stage. As shown in FIGS. 2 and 4, in the second stage, a high-level signal is applied to the first scanning line, a high level is applied to the second scanning line, a low level is applied to the control line, and a low level is applied to the data line. At this moment, the first switch T1 and the eighth switch T8 are turned off, and the second switch T2, the third switch T3, the fourth switch T4, the fifth switch T5, the sixth switch T6 and the seventh switch T7 are turned on. When the touch electrode D is touched by a finger, the voltage of the gate electrode of the second switch T2 connected with the touch electrode D is reduced to Vdata-Vf, at this moment, the absolute value of the gate-to-source voltage of the second switch T2 serving as the amplifying transistor is greater than the threshold voltage Vth for turning on the second switch, that is, |Vdata−Vf|>Vth. Accordingly, the second switch T2 is turned on, the generated touch current flows through the third electrode of the third switch T3, the reading line receives the touch current signal, and the touch current signal at this moment is less than the initial reference current signal in the first stage when touch does not occur. Herein the size of the touch electrode D depends on the manufacturing process of the amplifying transistor T2. FIG. 5 is a voltage change schematic diagram of a touch electrode in the touch display drive circuit in the embodiment. As shown in FIG. 5, the voltage Vd of the gate electrode D is equal to Vdata before being touched and reduced to Vdata−Vf after being touched, and at this moment, the reading line receives the changed signal, thus determining the position where the touch occurs. Simultaneously, the first end A of the second capacitor C2 discharges till its voltage achieves the threshold value Vthh of the drive transistor T9, and the voltage Vb of the second end of the second capacitor C2 still is Vdata. So far the processes of touch control signal acquisition and display discharge compensation are finished.

Figure 6:
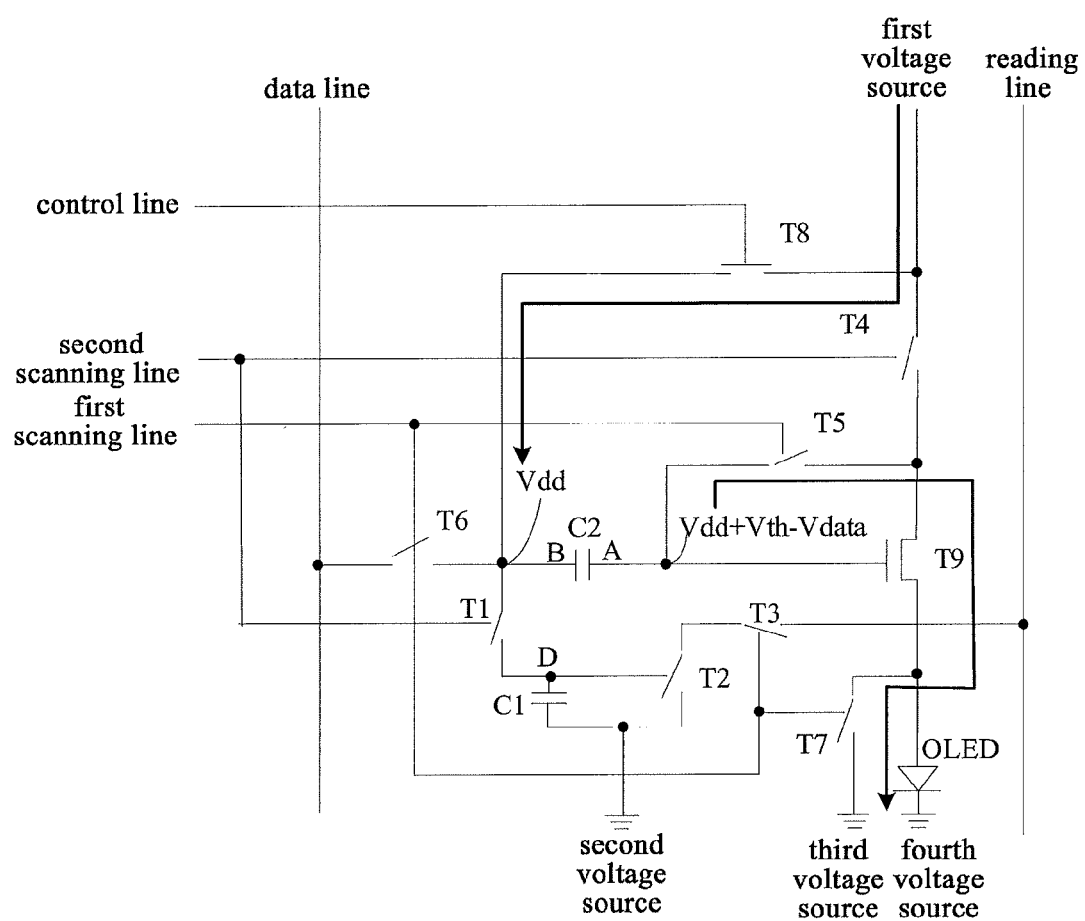
FIG. 6 is an equivalent circuit schematic diagram of the touch display drive circuit in the embodiment in a third stage.

FIG. 6 is an equivalent circuit schematic diagram of the touch display drive circuit in the embodiment in the third stage. As shown in FIGS. 2 and 6, in the third stage, a low level is applied to the first scanning line, a low level is applied to the second scanning line, a high level is applied to the signal line, and a high level is applied to the data line. At this moment, the first switch T1, the second switch T2, the third switch T3, the fourth switch T4, the fifth switch T5, the sixth switch T6 and the seventh switch T7 are turned off, the eighth switch T8 is turned on, and the touch module is in a standstill stage, that is, all the devices of the touch module do not work, which may reduce influence on the light emitting display of the light emitting unit. Simultaneously, discharging of the first end A of the second capacitor C2 is finished, and a stable voltage difference Vthh-Vdata exists between the first end A and the second end B of the second capacitor. Preparations are made for the light emitting unit to perform light emitting display in this stage.

Figure 7:
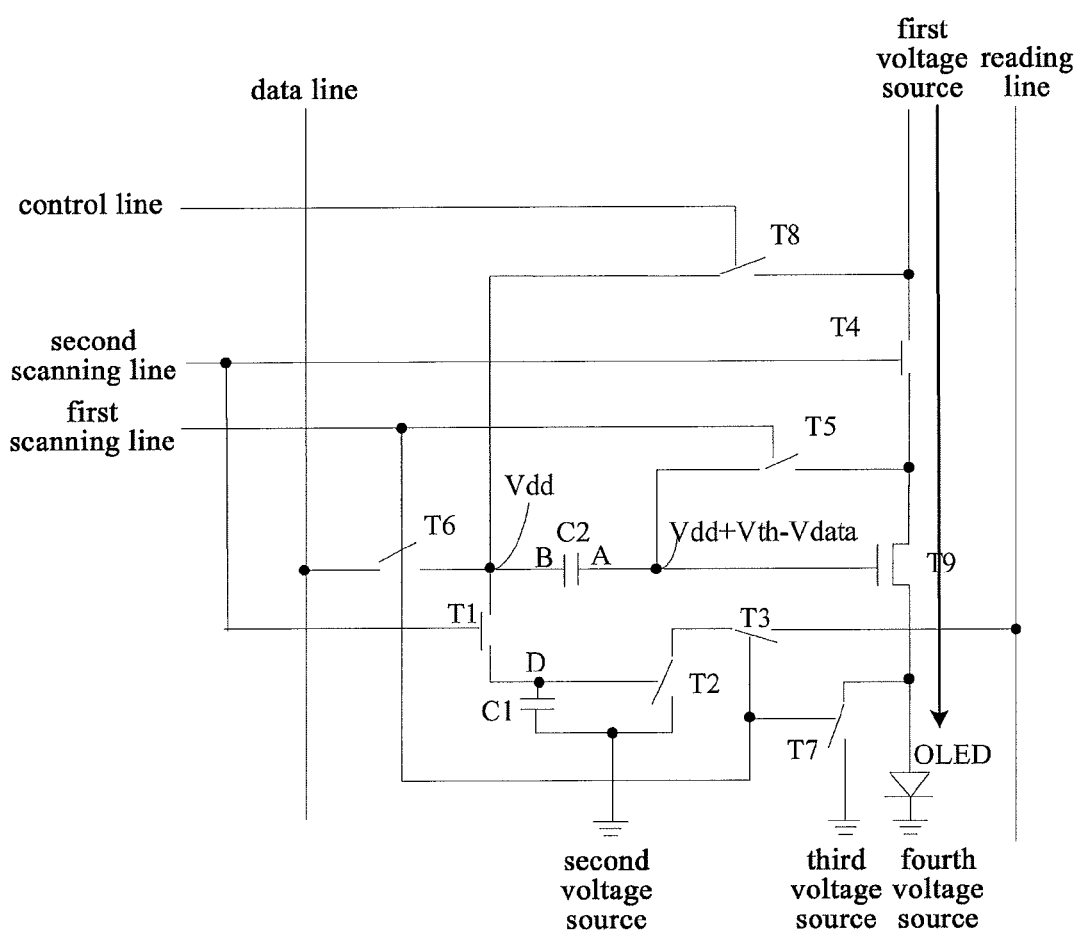
FIG. 7 is an equivalent circuit schematic diagram of the touch display drive circuit in the embodiment in a fourth stage.

FIG. 7 is an equivalent circuit schematic diagram of the touch display drive circuit in the embodiment in the fourth stage. As shown in FIGS. 2 and 7, in the fourth stage, a low level is applied to the first scanning line, a low level is applied to the second scanning line, a high level is applied to the signal line, and a high level is applied to the data line. Accordingly, the first switch T1, the second switch T2, the third switch T3, the fifth switch T5, the sixth switch T6, the seventh switch T7 and the eighth switch T8 are turned off, and the fourth switch T4 is turned on. At this moment, the voltage Vdd provided by the first voltage source is received by the second end B of the second capacitor C2, that is, the voltage of the second end B of the second capacitor C2 is changed to Vdd from the original Vdata, that is, Vb=Vdd, the voltage of the first end A of the second capacitor C2 is floating, the first end A and the second end B of the second capacitor C2 perform an equivalent voltage jump, whereas the original stable voltage difference Vthh-Vdata is maintained between Va and Vb, and therefore, Va=Vb+Vthh−Vdata+Vdd+Vthh−Vdata. Simultaneously, the light emitting unit enters into a light emitting stage, and at this moment, the equation below may be obtained from the saturated drive current formula of the drive transistor T9:

$$I = K[Vgs-Vthh]^2 = K[Vdd+Vthh-Vdata-Vc-Vthh]^2 = K(Vdd-Vdata-Vc)^2,$$

From the above equation, it can be known that the drive current I is only related to the voltage value Vdata provided by the data line, and therefore is free from the influence of the threshold voltage Vthh of the drive transistor T9, wherein Vgs is a voltage between the gate electrode and the source electrode of the drive transistor T9, and Vc is the drain electrode potential of the drive transistor T9.

In this embodiment, the touch module of the touch display drive circuit, under the control of the first switch T1, the second switch T2 and the third switch T3, transmits the changed voltage signal (that is, the touch signal) to the reading line, the reading line determines the touch signal in the position where touch occurs, and after determining the occurrence of the touch, the second capacitor C2 is charged, so that the voltage Vdd provided by the first voltage source and the threshold voltage Vthh of the drive transistor T9 are written into the second capacitor C2, and then the gate-to-source voltage is provided to the drive transistor T9 by the second capacitor C2 so as to compensate the threshold voltage of the drive transistor T9. The drive transistor T9 drives the light emitting unit to emit light for display, the drive current flowing through the drive transistor T9 is independent of the threshold voltage Vthh of the drive transistor T9, thus preventing the drive current flowing through the light emitting unit from being influenced by non-uniformity and drift of the threshold voltage Vthh. Simultaneously, the drive current flowing through the drive transistor T9 is also independent of its threshold voltage Vthh, preventing the drive current from being influenced by the rising of its threshold voltage Vthh caused by degeneration of the light emitting unit, thus improving the uniformity of the drive current flowing through the light emitting unit.

The touch display drive circuit provided by the embodiment comprises: a touch module and a display drive module; the display drive module, under the control of signals input from a data line, a first scanning line and a second scanning line, is used for compensating a drive unit, writing a data signal input from the data line, outputting the data signal to the touch module simultaneously, and then driving the light emitting unit to emit light; the touch module is used for receiving the data signal input from the display drive module under the action of the signals input from the first scanning line and the second scanning line so as to reset the touch module; when touch occurs, the touch module provides a touch signal, and the reading line receives the touch signal. According to the present invention, production processes for touch display products during production may be reduced, cost is saved, and aperture opening ratio of the products may be increased simultaneously, thus increasing additional value.

The embodiment of the present invention further provides a display device, comprising a touch display drive circuit comprising a touch module and a display drive module; the display drive module, under the control of signals input from a data line, a first scanning line and a second scanning line, is used for compensating a drive unit, writing a data signal input from the data line, outputting the data signal to the touch module simultaneously, and then driving the light emitting unit to emit light; the touch module is used for receiving the data signal input from the display drive module under the action of the signals input from the first scanning line and the second scanning line so as to reset the touch module; when touch occurs, the touch module provides a touch signal, and the reading line receives the touch signal. According to the present invention, production processes for touch display products during production may be reduced, cost is saved, and aperture opening ratio of the products may be increased simultaneously, thus increasing additional value.

Different from that TFT-LCD displays use stable voltage to control brightness, the OLED display device provided by the present invention belongs to current drive, and stable current is required to control light emitting. Due to the reasons of process manufacture procedures, device ageing and the like, the threshold voltages of the drive TFTs of respective pixel points are non-uniform in the most original 2T1C drive circuit, which results in the change of the OLED current flowing through each pixel point, thus influencing the display effect of the whole image. The influence due to the change of Vthh is solved by the pixel drive circuit of the present invention by means of compensation. Moreover, it is ensured that no current passes through the OLED except in the light emitting stage, thus prolonging the service life of the OLED.

The touch technology adopts capacitive touch which is the mainstream now. In the present invention, the touch electrode is designed in each pixel, when a finger is close to the screen, the coupling capacitance of the touch electrode is changed because of the intervention of the finger, which in turn causes the change of a node potential and the intensity of the signal acquired by a terminal device is increased, thus determining the position of the touch point.

Of course, a light-sensitive type touch sensing unit may also be adopted. Herein phototransistors are provided in respective pixel regions, when a user performs a touch operation, the light receiving amounts of the phototransistors are changed due to the influence of the light shielding generated by the user during touching, the phototransistors generate different leakage currents according to different light receiving amounts, and detection of the touch position may be realized by detecting the difference among the leakage currents of the phototransistors in different pixel regions.

In the circuit design provided by the embodiment of the present invention, integration of In Cell Touch function and pixel compensation function may be realized by only using a dual-signal channel, instead of the previous multi-signal channel, thus achieving convenient, fast and efficient working.

Meanwhile, since the AMOLED manufacture procedure of low temperature poly-silicon (LTPS) is adopted in the present invention, this design in which a plurality of thin film transistors are combined with capacitors may not influence the aperture opening ratio of the module.

The embodiment of the present invention further provides a drive method for a touch display circuit, which is based on the touch display drive circuit and comprises:

the first stage: the data writing unit writes a data signal into the drive compensation unit under the control of a signal input from the first scanning line, simultaneously under the control of a signal input from the second scanning line, the signal input unit inputs the data signal to the touch sensing unit, and the reading line receives an initial signal;

the second stage: the drive compensation unit compensates the threshold voltage of the drive unit under the control of the signal input from the first scanning line, simultaneously the touch sensing unit detects a touch signal, and the reading line receives the touch signal;

the third stage: the voltage stabilizing unit stabilizes the voltage of the drive compensation unit under the action of a control signal input from the control line, and at this moment, the touch sensing unit is in a standstill state; and the fourth stage: the light emitting control unit is controlled to be turned on by a signal input from the second scanning line, the light emitting unit emits light under the control of the light emitting control unit and the drive unit, and at this moment, the touch sensing unit is in a standstill state.

Optionally, The first stage specifically is: the sixth switch is turned on and writes a data signal into the second capacitor to charge the second capacitor under the control of a signal input from the first scanning line, the first switch is turned on and inputs the data signal to the first capacity to charge the first capacity under the control of a signal input from the second scanning line, the second switch and the third switch are turned on, and the reading line receives an initial signal.

The second stage specifically is: the fifth switch and the seventh switch are turned on, and the second capacitor discharges and compensates the threshold voltage of the drive transistor under the control of the signal input from the first scanning line, simultaneously the touch sensing unit detects a touch signal, and the reading line receives the touch signal.

The third stage specifically is: the eighth switch stabilizes the voltage of the third capacitor under the action of a control signal input from the control line, and at this moment, the touch sensing unit is in a standstill state.

The fourth stage specifically is: the fourth switch is controlled to be turned on by the signal input from the second scanning line, the light emitting unit emits light under the control of the fourth switch and the drive transistor, and at this moment, the touch sensing unit is in a standstill state.

According to the touch display drive method provided by the embodiment, the method is based on a touch display drive circuit comprising a touch module and a display drive module, wherein the display drive module, under the control of signals input from the data line, the first scanning line and the second scanning line, is used for compensating a drive unit, writing a data signal input from the data line, outputting the data signal to the touch module simultaneously, and then driving light emitting unit to emit light; the touch module is used for receiving the data signal input from the display drive module under the action of the signals input from the first scanning line and the second scanning line so as to reset the touch module; when touch occurs, the touch module provides a touch signal, and the reading line receives the touch signal. This may reduce production processes of touch display products during production, save cost, and simultaneously increase aperture opening ratio of the products, thus increasing additional value.

It will be understood that the foregoing embodiments are merely exemplary embodiments used for illustrating the principles of the present invention, however, the present invention is not limited thereto. Various modifications and improvements could be made by those skilled in the art without departing from the sprit and essence of the present invention, and these modifications and improvements should also be considered to be within the protection scope of the present invention.

The invention claimed is:

1. A touch display drive circuit, comprising: a touch module and a display drive module comprising a drive unit and a light emitting unit, wherein the display drive module is connected with a data line, a first scanning line, a second scanning line, a control line, a first voltage source, a third voltage source and a fourth voltage source, and the display drive module, under the control of only signals input from the first scanning line and the second scanning line, is configured for simultaneously compensating the drive unit, writing a data signal input from the data line, and outputting the data signal to the touch module, and subsequently driving the light emitting unit to emit light; and the touch module is connected with the first scanning line, the second scanning line, a reading line and a second voltage source, and the touch module, under the control of signals input from the data line, the first scanning line and the second scanning line, is configured for receiving the data signal input from the display drive module to reset the touch module, and when the touch module detects a touch signal, the reading line receives the touch signal.

2. The touch display drive circuit of claim 1, wherein the display drive module further comprises: a data writing unit, a drive compensation unit, a voltage stabilizing unit and a light emitting control unit;

the data writing unit is used for writing a data voltage provided by the data line into the drive compensation unit under the action of a signal input from the first scanning line;

the voltage stabilizing unit is used for stabilizing a voltage of the drive compensation unit under the action of a control signal input from the control line;

the drive compensation unit is used for performing discharge compensation on a threshold voltage of the drive unit under the action of a signal input from the first scanning line; and the light emitting unit is used for emitting light under a drive of the drive unit and the light emitting control unit.

3. The touch display drive circuit of claim 2, wherein the data writing unit comprises a sixth switch, the drive compensation unit comprises a second capacitor, a fifth switch and a seventh switch, the drive unit comprises a drive transistor, the voltage stabilizing unit comprises an eighth switch, the light emitting control unit comprises a fourth switch, and the light emitting unit comprises a light emitting diode, a gate electrode of the fourth switch is connected with the second scanning line, a first electrode of the fourth switch is connected with a second electrode of the eighth switch and the first voltage source, and a second electrode of the fourth switch is connected with a second electrode of the fifth switch and a first electrode of the drive transistor, a gate electrode of the fifth switch is connected with a gate electrode of the sixth switch and the first scanning line, a first electrode of the fifth switch is connected with a first end of the second capacitor and a gate electrode of the drive transistor, and a second electrode of the fifth switch is connected with the first electrode of the drive transistor;

the gate electrode of the sixth switch is connected with the first scanning line, a first electrode of the sixth switch is connected with the data line, and a second electrode of the sixth switch is connected with a first electrode of the eighth switch, the second end of the second capacitor and a first electrode of a first switch;

a gate electrode of the seventh switch is connected with the first scanning line and a gate electrode of a third switch, a first electrode of the seventh switch is connected with a second electrode of the drive transistor and the light emitting unit, and a second electrode of the seventh switch is connected with the third voltage source;

a gate electrode of the eighth switch is connected with the control line, the first electrode of the eighth switch is connected with the second end of the second capacitor and the first electrode of the first switch, and the second electrode of the eighth switch is connected with the first voltage source; and the gate electrode of the drive transistor is connected with the first end of the second capacitor, and the second electrode of the drive transistor is connected with the light emitting unit.

4. The touch display drive circuit of claim 1, wherein the touch module comprises: a signal input unit and a touch sensing unit connected with the signal input unit, the signal input unit is used for writing a voltage signal input from the data line into the touch sensing unit under the control of a signal input from the second scanning line;

the touch sensing unit is used for providing a touch signal for the reading line when touch occurs.

5. The touch display drive circuit of claim 4, wherein the signal input unit comprises the first switch, and the touch sensing unit comprises a first capacitor, a second switch and the third switch;

a gate electrode of the first switch is connected with the second scanning line, the first electrode of the first switch is connected with the drive compensation unit, and a second electrode of the first switch is connected with the touch electrode;

a gate electrode of the second switch is connected with the touch electrode, a first electrode of the second switch is connected with a first electrode of the third switch, and a second electrode of the second switch is connected with a second end of the first capacitor and the second voltage source;

the gate electrode of the third switch is connected with the drive compensation unit, and a second electrode of the third switch is connected with the reading line; and a first end of the first capacitor is connected with the second electrode of the first switch and the gate electrode of the second switch, and the second end of the first capacitor is connected with the second voltage source.

6. The touch display drive circuit of claim 5, wherein the first switch, the second switch, the third switch, the fourth switch, the fifth switch, the sixth switch, the seventh switch, the eighth switch and the drive transistor are N-type thin film transistors, and the second switch is an amplifying transistor.

7. A display device, comprising the touch display drive circuit of claim 1.

8. A drive method for the touch display circuit of claim 1, wherein the touch display drive method comprises:

a first stage: the data writing unit writes a data signal into the drive compensation unit under the control of a signal input from the first scanning line, the signal input unit inputs the data signal to the touch screening unit under the control of a signal input from the second scanning line simultaneously, and the reading line receives an initial signal;

a second stage: the drive compensation unit compensates a threshold voltage of the drive unit under the control of a signal input from the first scanning line, simultaneously the touch sensing unit detects a touch signal, and the reading line receives the touch signal;

a third stage: the voltage stabilizing unit stabilizes a voltage of the drive compensation unit under the action of a control signal input from the control line, and at this moment, the touch sensing unit is in a standstill state; and a fourth stage: the light emitting control unit is controlled to be turned on by a signal input from the second scanning line, the light emitting unit emits light under the control of the light emitting control unit and the drive unit, and at this moment, the touch sensing unit is in a standstill state.

9. The touch display drive method of claim 8, wherein in the first stage: the sixth switch is turned on to write the data signal into the second capacitor to charge the second capacitor under the control of the signal input from the first scanning line, the first switch is turned on to input the data signal to the first capacity to charge the first capacity under the control of the signal input from the second scanning line, the second switch and the third switch are turned on, and the reading line receives the initial signal;

in the second stage: the fifth switch and the seventh switch are turned on, and the second capacitor discharges and compensates the threshold voltage of the drive transistor under the control of the signal input from the first scanning line, simultaneously the touch sensing unit detects the touch signal, and the reading line receives the touch signal;

in the third stage: the eighth switch stabilizes the voltage of the drive compensation unit under the action of the control signal input from the control line, at this moment, the touch sensing unit is in the standstill state; and in the fourth stage: the fourth switch is controlled to be turned on by the signal input from the second scanning line, the light emitting unit emits light under the control of the fourth switch and the drive transistor, and at this moment, the touch sensing unit is in the standstill state.

10. The touch display drive method of claim 9, wherein the first switch, the second switch, the third switch, the fourth switch, the fifth switch, the sixth switch, the seventh switch, the eighth switch and the drive transistor are N-type thin film transistors, and the second switch is an amplifying transistor.

11. The touch display drive circuit of claim 2, wherein the touch module comprises: a signal input unit and a touch sensing unit connected with the signal input unit, the signal input unit is used for writing a voltage signal input from the data line into the touch sensing unit under the control of a signal input from the second scanning line;

the touch sensing unit is used for providing a touch signal for the reading line when touch occurs.

12. The touch display drive circuit of claim 3, wherein the touch module comprises: a signal input unit and a touch sensing unit connected with the signal input unit, the signal input unit is used for writing a voltage signal input from the data line into the touch sensing unit under the control of a signal input from the second scanning line;

the touch sensing unit is used for providing a touch signal for the reading line when touch occurs.

13. The touch display drive circuit of claim 11, wherein the signal input unit comprises the first switch, and the touch sensing unit comprises a first capacitor, a second switch and the third switch;

a gate electrode of the first switch is connected with the second scanning line, the first electrode of the first switch is connected with the drive compensation unit, and a second electrode of the first switch is connected with the touch electrode;

a gate electrode of the second switch is connected with the touch electrode, a first electrode of the second switch is connected with a first electrode of the third switch, and a second electrode of the second switch is connected with a second end of the first capacitor and the second voltage source;

the gate electrode of the third switch is connected with the drive compensation unit, and a second electrode of the third switch is connected with the reading line; and a first end of the first capacitor is connected with the second electrode of the first switch and the gate electrode of the second switch, and the second end of the first capacitor is connected with the second voltage source.

14. The touch display drive circuit of claim 12, wherein the signal input unit comprises the first switch, and the touch sensing unit comprises a first capacitor, a second switch and the third switch;

a gate electrode of the first switch is connected with the second scanning line, the first electrode of the first switch is connected with the drive compensation unit, and a second electrode of the first switch is connected with the touch electrode;

a gate electrode of the second switch is connected with the touch electrode, a first electrode of the second switch is connected with a first electrode of the third switch, and a second electrode of the second switch is connected with a second end of the first capacitor and the second voltage source;

the gate electrode of the third switch is connected with the drive compensation unit, and a second electrode of the third switch is connected with the reading line; and a first end of the first capacitor is connected with the second electrode of the first switch and the gate electrode of the second switch, and the second end of the first capacitor is connected with the second voltage source.

15. The touch display drive circuit of claim 13, wherein the first switch, the second switch, the third switch, the fourth switch, the fifth switch, the sixth switch, the seventh switch, the eighth switch and the drive transistor are N-type thin film transistors, and the second switch is an amplifying transistor.

16. The touch display drive circuit of claim 14, wherein the first switch, the second switch, the third switch, the fourth switch, the fifth switch, the sixth switch, the seventh switch, the eighth switch and the drive transistor are N-type thin film transistors, and the second switch is an amplifying transistor.

* * * * *